US007735728B2

(12) United States Patent
Wallerstorfer

(10) Patent No.: US 7,735,728 B2
(45) **Date of Patent: *Jun. 15, 2010**

(54) ACCESS CONTROL SYSTEM

(75) Inventor: Kurt Wallerstorfer, Irrsdorf (AT)

(73) Assignee: SkiData AG, Gartenau (AT)

( * ) Notice: Subject to any disclaimer, the term of this patent is extended or adjusted under 35 U.S.C. 154(b) by 1032 days.

This patent is subject to a terminal disclaimer.

(21) Appl. No.: 11/249,050

(22) Filed: Oct. 12, 2005

(65) Prior Publication Data

US 2006/0167833 A1 Jul. 27, 2006

(30) Foreign Application Priority Data

Oct. 13, 2004 (EP) ................................. 04024353

(51) Int. Cl.

*G06K 5/00* (2006.01)
*G06K 19/00* (2006.01)
*G06K 9/00* (2006.01)
*G06Q 10/00* (2006.01)
*G06Q 20/00* (2006.01)
*G06F 7/00* (2006.01)

(52) U.S. Cl. ....................... 235/382; 235/380; 235/487; 705/1; 705/75; 707/1; 382/100; 382/118

(58) Field of Classification Search ................. 235/382, 235/380, 487; 707/1; 382/100, 118; 705/1, 705/75

See application file for complete search history.

(56) References Cited

U.S. PATENT DOCUMENTS 4,581,634 A * 4/1986 Williams .................... 348/156
4,821,118 A * 4/1989 Lafreniere .................. 348/156
5,095,196 A * 3/1992 Miyata ....................... 235/382
5,386,103 A 1/1995 DeBan et al.
5,432,864 A * 7/1995 Lu et al. ..................... 382/118
5,513,272 A * 4/1996 Bogosian, Jr. ............... 382/116
5,553,277 A * 9/1996 Hirano et al. ............ 707/104.1
5,594,806 A * 1/1997 Colbert ....................... 382/115
6,128,398 A * 10/2000 Kuperstein et al. .......... 382/118
6,252,978 B1 6/2001 Grantz
6,311,214 B1 10/2001 Rhoads
6,522,770 B1 2/2003 Seder et al.
6,650,761 B1 11/2003 Rodriguez et al.
6,698,653 B1 * 3/2004 Diamond et al. ............ 235/375

(Continued)

FOREIGN PATENT DOCUMENTS

EP 0758776 A2 2/1997

(Continued)

*Primary Examiner*—Daniel Walsh
(74) *Attorney, Agent, or Firm*—Flynn, Thiel, Boutell & Tanis, P.C.

(57) ABSTRACT

A system with at least one access control device (1) exhibiting an access authorization reader (4) for data carrier (8) containing access authorization and identification data, a database (9) and a camera (7). Once a valid access authorization is read, the identification data from the data carrier in question (8) and a digitized image of the user taken by the camera (7) are stored in the database. The stored image of the user of the particular data carrier can be transferred from the database (9) to terminals (11 to 13), in order to compare it with a image of the user previously taken and stored in the database (9). If the images of the user do not match, further access is denied for that particular data carrier (8).

18 Claims, 1 Drawing Sheet

U.S. PATENT DOCUMENTS 6,801,640 B1 * 10/2004 Okubo et al. ............... 382/118
6,801,907 B1 * 10/2004 Zagami ......................... 707/3
7,039,237 B2 * 5/2006 Watkins et al. .............. 382/218
7,158,038 B2 * 1/2007 Fujie ....................... 340/573.4
7,183,895 B2 * 2/2007 Bazakos et al. .............. 340/5.7
7,212,655 B2 * 5/2007 Tumey et al. ............... 382/116
7,360,695 B2 * 4/2008 Ponert et al. ................ 235/382
7,362,210 B2 * 4/2008 Bazakos et al. ............ 340/5.53
7,421,097 B2 * 9/2008 Hamza et al. ............... 382/118
7,631,806 B2 * 12/2009 Wallerstorfer et al. ...... 235/382
2001/0018660 A1 * 8/2001 Sehr ............................. 705/5
2001/0023193 A1 9/2001 Rhoads
2001/0026632 A1 10/2001 Tamai
2001/0031072 A1 * 10/2001 Dobashi et al. ............. 382/118
2001/0032251 A1 10/2001 Rhoads et al.
2002/0016740 A1 * 2/2002 Ogasawara .................. 705/26
2002/0016816 A1 2/2002 Rhoads
2002/0018579 A1 2/2002 Rhoads et al.
2002/0028000 A1 3/2002 Conwell et al.
2002/0032864 A1 3/2002 Rhoads et al.
2002/0033844 A1 3/2002 Levy et al.
2002/0044171 A1 * 4/2002 Hirahara et al. ............... 347/46
2002/0062382 A1 5/2002 Rhoads et al.
2002/0093425 A1 * 7/2002 Puchek et al. ............... 340/540
2002/0112165 A1 8/2002 Rhoads et al.
2002/0131076 A1 9/2002 Davis
2002/0158750 A1 * 10/2002 Almalik ..................... 340/5.83
2002/0164053 A1 11/2002 Seder et al.
2002/0170966 A1 11/2002 Hannigan et al.
2002/0181736 A1 12/2002 Seder et al.
2002/0181737 A1 12/2002 Seder et al.
2002/0191817 A1 * 12/2002 Sato et al. ................... 382/118
2003/0012403 A1 1/2003 Rhoads et al.
2003/0037075 A1 2/2003 Hannigan et al.
2003/0040957 A1 2/2003 Rodriguez et al.
2003/0050961 A1 3/2003 Rodriguez et al.
2003/0056104 A1 3/2003 Carr et al.
2003/0086591 A1 * 5/2003 Simon ........................ 382/115
2003/0105730 A1 6/2003 Rhoads et al.
2003/0130954 A1 7/2003 Carr et al.
2003/0185423 A1 * 10/2003 Dobashi ..................... 382/118
2003/0198368 A1 10/2003 Kee
2004/0017929 A1 * 1/2004 Bramblet et al. ............ 382/103
2004/0056087 A1 * 3/2004 Bonneau et al. ............. 235/380
2004/0086157 A1 * 5/2004 Sukegawa ................... 382/115
2004/0128514 A1 7/2004 Rhoads
2004/0153649 A1 8/2004 Rhoads et al.
2004/0190750 A1 9/2004 Rodriguez et al.
2004/0258275 A1 12/2004 Ebihara
2005/0110610 A1 * 5/2005 Bazakos et al. ............ 340/5.82
2005/0144444 A1 * 6/2005 Hall et al. ................... 713/168
2005/0179553 A1 * 8/2005 Fujie ........................ 340/573.4
2005/0205668 A1 * 9/2005 Sogo .......................... 235/382
2005/0212654 A1 * 9/2005 Yoda ......................... 340/5.53
2006/0000144 A1 * 1/2006 Wallerstorfer et al. ......... 49/47
2006/0040679 A1 * 2/2006 Shikano et al. ............. 455/457
2006/0082438 A1 * 4/2006 Bazakos et al. ............ 340/5.82
2006/0124734 A1 * 6/2006 Wallerstorfer et al. ...... 235/382
2006/0140460 A1 * 6/2006 Coutts ........................ 382/124
2006/0167833 A1 * 7/2006 Wallerstorfer .................. 707/1
2006/0181392 A1 * 8/2006 Watson ...................... 340/5.73
2006/0262187 A1 * 11/2006 Takizawa ..................... 348/77
2007/0001002 A1 * 1/2007 Ponert et al. ................ 235/382
2007/0181695 A1 * 8/2007 Keshura ..................... 235/488
2007/0252001 A1 * 11/2007 Kail et al. ................... 235/380
2008/0004892 A1 * 1/2008 Zucker .......................... 705/1
2008/0120909 A1 * 5/2008 Ponert et al. ................... 49/31

FOREIGN PATENT DOCUMENTS

EP 758776 A2 * 2/1997
EP 0962894 A2 12/1999
JP 2002352230 A * 12/2002
JP 2005301861 A * 10/2005

* cited by examiner

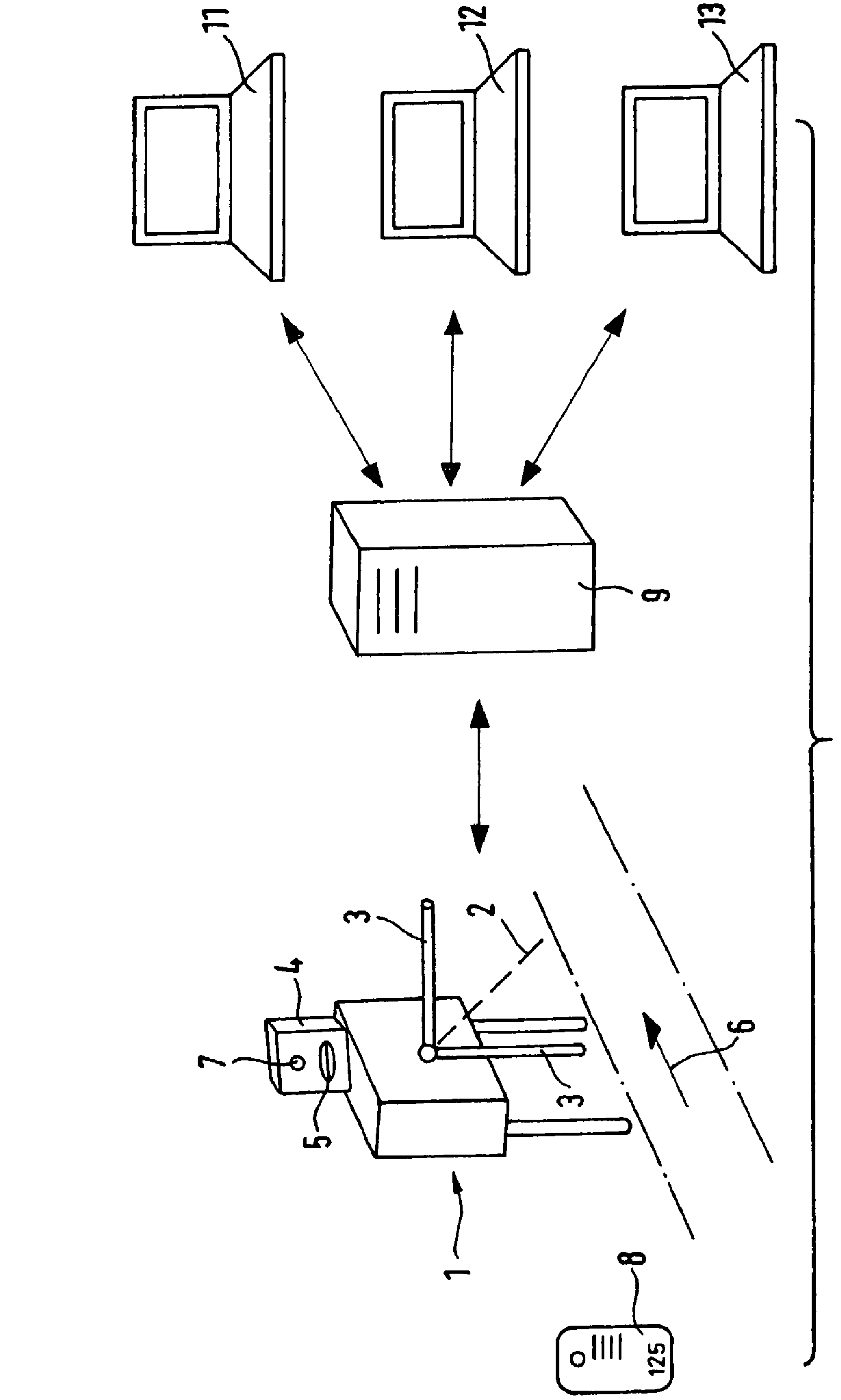
FIGURE

ACCESS CONTROL SYSTEM

FIELD OF THE INVENTION

The invention pertains to a system comprising at least one access control device with an access authorization reader for a data carrier.

BACKGROUND OF THE INVENTION

Systems for access control are used, for example, for cable cars and ski lifts. In addition to single trip tickets, daily, weekly and seasonal passes are issued, especially for winter sports, and often for a complex of cable cars and ski lifts throughout an entire region. Considerable price reductions are granted for the longer-term passes compared to the price for individual trips, but the former are not transferable to other persons.

The unauthorized transfer of longer-term tickets is, however, a widespread practice. It often happens, for example, that a skier who has bought a ticket early in the morning discontinues skiing around midday and then gives the card to a friend, or in some cases even to a stranger in the parking lot. Lift operators incur considerable financial losses as a result of this practice. In order to prevent such unauthorized transfers, an identification photo of the buyer is therefore taken and affixed to the ticket when it is purchased, so that ticket collectors can compare the photo on the ticket with the person who is using it. However, processing the photos and affixing them to the tickets is costly and time-consuming, with the result that this is only practical for higher-value tickets, such as weekly or seasonal passes.

Another well-known system is the technique of storing a digitized image of the ticket purchaser in a database, along with identification data for the particular ticket, and installing a device with a display screen at the point of access. The image of the ticket holder is transmitted from the database and displayed on the screen once the identification data for the ticket has been entered by the ticket collector. This allows the control personnel to compare the user with the image on the screen. However, this method of checking is also time-consuming and is considered a serious inconvenience by legitimate ticket holders, so that this access control method can only be implemented in exceptional cases.

Automatic face recognition via photo processing is scarcely applicable for access control systems, and not at all practical for winter sports because of the caps, headbands, goggles, sunglasses, scarves and the like, which cover the face of the skier.

The purpose of the invention is to provide a simple, effective system for controlling non-transferable data carriers for access authorization without unduly inconveniencing access users.

SUMMARY OF THE INVENTION

According to the invention, the system consists of one or more access control devices. It can therefore involve any equipment for controlling personal access, such as turnstiles, photoelectric barriers, and the like. An access authorization reader, which permits access upon reading a valid access authorization on the data carrier, is located at the access control device or at each device; it could, for example, control the motor of a motor-actuated turnstile, allowing the user of the data carrier to pass. The access authorization reader can be a contact-type reading device, for example for bar-coded, magnetic or SmartCard data storage media, or a contact-less reading device, such as a wireless RFID transponder. For example, access authorization can be imprinted, or stored on the data storage device at the ticket office at the time of purchase.

The data carrier holds identification data constituting a unique reference or code signal for that particular data carrier. This may consist of visual information, for example alphanumeric data printed on the ticket. The identification data can also be in the form of a barcode or recorded on a magnetic card or SmartCard. For cards with a chip, i.e. contact-type SmartCards or RFID transponders, the identification data can also be the serial number of the chip. The identification data can also be identical with the access authorization data, provided the latter consist of a unique code. The identification data for the data carrier can also be an access authorization reference code that can be retrieved from the database by the access control device.

With the system according to the invention, access can be controlled to any facilities, such as special events, sports stadia or swimming pools. It is, however, especially suited to personal transportation systems, primarily ski lifts, cable cars and similar installations in a ski area. In principle, a variety of these personal transportation systems in a winter sports area can be accessed using one data carrier holding one access authorization. The access authorization readers on the access control equipment for individual ski lifts, funiculars and similar personal transportation systems are connected to a central database, in which for every access the identification data from the particular data carrier and any additional access information are stored, such as the time of access and the identifying data for the access control device in question.

According to the invention, a camera is located at the point of access, which takes a image upon access, preferably of the head and shoulders of the user of the data carrier; the information is then stored in digitized form in the database.

The camera can be a simple Webcam which, for example, can be integrated into the housing of the access authorization reader. The housing need only have a small opening for the lens, so that the camera is practically invisible. The camera is preferably actuated by the access authorization reader while it is reading the data carrier.

Actuation of the camera and storage of the image can take place upon every access. However, this is preferably done only for access with high-value data carrier such as for day passes and similar data carrier authorizing longer-term access, but not for single trip tickets. Also, with longer-term access authorizations the recording and storage of an image of the user of the data carrier need not take place with every access, but only after certain periods, for example once an hour.

According to the invention, the images stored in the database, as well as the identification data for the particular data carrier are matched to each image and, if necessary, any additional access data such as access time and data identifying the particular access control device, can be transferred to, or are retrievable from, one or preferably more terminals with display screens. The terminals can communicate with the database over the Internet for this purpose. In particular, the terminal can be a PC.

The PC or terminal operator can visually compare on screen the image of the user of the data carrier that is taken by the camera at the access control device and stored in the database with the image taken earlier of the data carrier user and already stored in the database. This can be an image taken previously by the camera at the access control device, or one of the access control devices. However, the image for visual comparison purposes can also have been taken at another location, for example at the ticket office when the data carrier was purchased, and stored in the database in digital format.

According to the invention, a visual comparison of the images of the user of the particular data carrier takes place at a location remote from that of the access control device. Thus, the user is not aware of the access control with the system according to the invention so that the system according to the invention excludes any feelings of inconvenience on the part of the user.

Since, according to the invention, the database can communicate with several terminals or PCs, a large number of visual comparisons can be carried out in a short time, thereby substantially increasing the reliability and effectiveness of the control process. There is also the advantage that communication via the Internet enables visual comparisons to be made at remote locations such as in so-called "call centers" in other countries.

In order to reduce the number of images for comparison without appreciably reducing the effectiveness of the control process, a computer program is preferably provided, which selects certain of the user images stored in the database for visual comparison on screen.

In this way, only images of users of higher-value data carriers can be selected and transferred for visual comparison, for example only those with weekly or season passes.

It is furthermore possible to perform a behavior analysis for the user of the data carrier, specifically in relation to access times and the access control devices in question, and on this basis, to select which images should be used for comparison.

A typical misuse of a data carrier with non-transferable access authorization, such as a day pass for winter sports, is the situation where the first user, who bought the ticket early in the morning, travels to the higher altitudes using a ski lift, cable car or similar means, spends the morning there and around midday returns to the valley in order to pass on the ticket to someone else, in the parking lot, for example. When the database detects this type of behavior, an image of the user can be taken by the camera at the access control point in the valley, stored in the database, and transferred to the PC for visual control. If the visual comparison on the screen reveals that the image of the user who bought or used the ticket in the morning is not identical with that of the person who wants to use it to access higher elevations from the valley in the afternoon, a misuse of the non-transferable data carrier is established.

The disparity between the images of the users of the same data carrier detected by the terminal operator conducting the visual comparison is transmitted to the database, so that further access to the lifts and cable cars can be denied for the data carrier in question. In other words, further access using the particular data carrier can be blocked or an alarm can be triggered if it is used again. The blockage can be effected by causing the access authorization reader to no longer interpret the particular data carrier as enabling authorized access, so that the turnstile remains locked, for example. An optical and/or acoustic alarm can also be activated when the access authorization reader reads the particular data carrier, so that operators at the access control device can refuse access to the user of the data carrier.

Furthermore, statistical methods can be used to select certain images for visual comparison from among the stored user images. For example, the AQL (Acceptable Quality Level) sampling system, an international quality assurance system, can be utilized to select images of the user. This determines the upper threshold for an acceptable mean quality level.

In order to reduce the amount of data to be processed, the selection program can control the image recording with the camera and/or the image storage in the database from the terminal.

A further advantage is a computer program that locates the head of the data carrier user, and cuts it out, so to speak, so that only a digitized image of the user's head is transmitted or stored, thus reducing the data set accordingly.

Also advantageous is a computer program which registers and stores for comparison purposes the color patterns in the user's clothing, whereby further access can be denied if there are major deviations in the color pattern, by setting off an alarm or automatically blocking access.

Furthermore, a computer program can be provided that positively recognizes and stores biometric characteristics such as facial form for comparison purposes, whereby major deviations can automatically trigger an alarm or block access.

The camera is activated to take an image of the user upon access when the authorized access reader processes the data carrier or when the user moves forward and is detected by sensors.

BRIEF DESCRIPTION OF THE DRAWING

The invention is explained in greater detail below, with the aid of the attached drawing which shows schematically one embodiment of the system according to the invention.

DETAILED DESCRIPTION OF THE INVENTION

According to the drawing, a turnstile-form access control device 1 consists of a turnstile with two arms 3 rotating about an axis 2 and an access reading device in a housing 4. A data carrier in the form of a card 8 containing a non-transferable access authorization, such as a barcode, is inserted into the card slot 5 of the access reading device 4. The turnstile rotates once the access reading device 4 has successfully read the access authorization, granting access 6.

When the data carrier 8 is inserted into the slot 5, an image of the user of the data carrier is taken with the camera in the housing 4, of which only the lens 7 is visible. The data carrier is provided with identification data, "125" for example. This identification data, along with the digitized image taken of the user by the camera 7, is stored in a database 9.

The stored image of the user, together with the applicable identification code "125", can be transferred from the database 9 to terminals with display screens, such as PCs 11 to 13. In this way, a visual comparison between the image of the user of the data carrier in question 8 and an earlier image of the user of the same data carrier is possible using PCs 11 to 13. If the images of the user of the particular data carrier 8 do not correspond with the person's visual appearance, the operator of the PCs 11 to 13 reports this to the database 9 or to other checkpoints via the Internet, and further access for the data carrier 8 can then be blocked.

The invention claimed is:

1. A system comprising at least one access control device providing access into a controlled area including an access authorization reader for reading a data carrier containing access authorization and identification data, and a database for storing the identification data from the data carrier in question, the access control device including a camera activatable by the reading of the data carrier or by sensors detecting forward movement of the user for taking an initial digitized image of the user of the data carrier upon an initial access into a controlled area that is permitted regardless of the digitized image, and for storing the image in the database along with the identification data for the data carrier, and at least one terminal with a display screen, to which the stored image of the user of the relevant data carrier taken by the camera of the one access control device is transferred for visual comparison with a subsequent image taken by the camera of the at least one access control device during a subsequent access into said controlled area, wherein the subsequent access includes reading of said data carrier and the subsequent image taking, and wherein the user of the particular data carrier is denied further access into the controlled area if the user images do not match, and wherein the initial access into the controlled area is permitted even when the initial image taken does not match an image of the user previously stored in the database before the initial access attempt.

2. A system according to claim 1, wherein the database stores the time of access, the information data for the data carrier and selectively stores an image of the user at the point of access.

3. The system according to claim 2, the system comprising a plurality of the access control devices, and wherein the database initially stores the image of the user having the data carrier at an initial access by the user through a first one of the plurality of said access control devices.

4. A system according to claim 1, comprising several access control devices, wherein the database stores the identification data from the data carrier together with data identifying the particular access control device, once a valid access authorization has been read by one of the access control devices.

5. A system according to claim 1, wherein the terminal comprises a remote terminal, the system including transfer of the images and the data carrier identification data from the database to the remote terminal via the Internet.

6. A system according to claim 1, including a computer program for isolating and storing only a digitized image of the head of the user.

7. A system according to claim 1, including a computer program that executes to register and store for comparison purposes the color patterns of the user's clothing from the initial image so that the user of the data carrier in question is denied further access in response to deviations in the color patterns of the user's clothing.

8. The system according to claim 1, wherein the system enables access for certain of the data carriers while periodically acquiring the image of the user.

9. The system according to claim 1, wherein the data carrier is free from an image of the user provided thereon.

10. A system comprising at least one access control device providing access into a controlled area including an access authorization reader for reading a data carrier containing access authorization and identification data, and a database for storing the identification data from the data carrier in question, the access control device including a camera activatable by the reading of the data carrier or by sensors detecting forward movement of the user for taking an initial digitized image of the user of the data carrier upon an access, and for storing the image in the database along with the identification data for the data carrier, at least one terminal with a display screen, to which the stored image of the user of the relevant data carrier taken by the camera of the one access control device is transferred for visual comparison with a subsequent image taken by the camera of the at least one access control device during a subsequent access into said controlled area, wherein the subsequent access includes reading of said data carrier, and a selection program for selecting certain data carriers for the transmission of images from the database to the terminal for visual comparison purposes, wherein the data carrier is free from an image of the user, and wherein the user of the particular data carrier is denied further access into the controlled area if the user images do not match, wherein the initial access is permitted even when the initial image taken does not match an image of the user previously stored in the database before the initial access attempt.

11. A system according to claim 10, wherein the selection program selects the data carriers for the transmission of images according to their value, based on at least one of a behavior analysis of the user of the data carrier and statistics, and does not select other said data carriers for the transmission of images as a result of their value.

12. A system according to claim 10, wherein the selection program controls the images selectively taken by the camera and the selective storage of images in the database.

13. A method of providing access to a controlled area comprising the steps of: providing a system including at least two access control devices, each said access control device including an access authorization reader, a terminal with a display screen and a camera for taking a digitized image, said system including a database receiving and sending information to said at least two access control devices; providing a data carrier for each individual user, the data carrier containing access authorization and identification data for enabling access to the controlled area; determining attempted entry of the controlled area at one of the at least two access control devices by detecting the data carrier carried by an individual user with the respective access authorization reader; in response to an initial detection of the data carrier, taking an initial digitized image of the user with the data carrier at the one access control device, and permitting an initial access into the controlled area even when the initial image taken does not match an image of the user previously stored in the database before the initial access attempt; providing the initial image of the user and the corresponding data carrier authorization and identification data to the database for storage in the database; visually comparing a subsequent image taken at the access control device with the initial image stored in the database for the user; determining for the user with the data carrier whether the initial image and the subsequent image match; and detecting a subsequent entering of a selected one of the at least two access control devices by reading the data carrier carried by the individual user with the corresponding access authorization reader and permitting entry only if the previous visual comparison of the images match.

14. The method according to claim 13, the step of permitting entry comprising opening a gate to allow the user entrance to the controlled area when the images match.

15. The method according to claim 13, including the step of selectively acquiring the image of a user depending on a value stored on the data carrier.

16. The method according to claim 15, including the step of enabling initial access of a user with a valid data carrier regardless of the acquisition of an image.

17. The method according to claim 13, wherein the initial image and the subsequent images are taken by the same camera of an access control device.

18. The method according to claim 13, wherein when the previous images do not match, the step of denying entry occurs without either of a comparison of an image taken upon the denied entry and without the taking of an image during the denied entry.

* * * * *